United States Patent
Müller et al.

(10) Patent No.: US 7,810,836 B2
(45) Date of Patent: Oct. 12, 2010

(54) INVISIBLE AIRBAG COVER HAVING A TEAR LINE

(75) Inventors: Henry Müller, Landshut (DE); Rudolf Aichner, Kirchberg (DE)

(73) Assignee: Lisa Draxlmaier GmbH, Vilsbiburg (DE)

( * ) Notice: Subject to any disclaimer, the term of this patent is extended or adjusted under 35 U.S.C. 154(b) by 790 days.

(21) Appl. No.: 11/484,365

(22) Filed: Jul. 11, 2006

(65) Prior Publication Data

US 2007/0018435 A1    Jan. 25, 2007

(30) Foreign Application Priority Data

Jul. 22, 2005    (DE) ................. 10 2005 034 354

(51) Int. Cl.
*B60R 21/205*    (2006.01)

(52) U.S. Cl. .................................. 280/728.2

(58) Field of Classification Search .............. 280/728.3, 280/732
See application file for complete search history.

(56) References Cited

U.S. PATENT DOCUMENTS

| | | | |
|---|---|---|---|
| 5,231,253 A | 7/1993 | Breed et al. | |
| 5,308,112 A | 5/1994 | Hill et al. | |
| 5,316,822 A | 5/1994 | Nishijima et al. | |
| 5,443,777 A | 8/1995 | Mills | |
| 5,488,092 A | 1/1996 | Kausch et al. | |
| 5,698,283 A * | 12/1997 | Yamasaki et al. | 428/43 |
| 5,839,752 A * | 11/1998 | Yamasaki et al. | 280/728.3 |
| 5,868,420 A | 2/1999 | Higashiura et al. | |
| 5,941,558 A * | 8/1999 | Labrie et al. | 280/728.3 |
| 5,979,931 A | 11/1999 | Totani et al. | |
| 5,997,030 A * | 12/1999 | Hannert et al. | 280/728.3 |

(Continued)

FOREIGN PATENT DOCUMENTS

DE    19516230 C2    11/1996

(Continued)

OTHER PUBLICATIONS

European Search Report EP06011961, dated Oct. 10, 2006.

(Continued)

*Primary Examiner*—Paul N Dickson
*Assistant Examiner*—Robert A Coker
(74) *Attorney, Agent, or Firm*—Wolf, Greenfield & Sacks, P.C.

(57) ABSTRACT

An airbag cover, in particular for use in motor vehicles, is disclosed. In one embodiment, the airbag cover includes a molding and a visible cover of leather or leather-like material covering the molding, where at least one layer of a material that is softer than the material of the molding is disposed between the molding and the visible cover. The visible cover has a partial weakening and the transition from the weakened area to the non-weakened area is designed constant. A method for covering a molding disposed above an airbag with a partially weakened visible cover is also disclosed. In one embodiment, the method includes introducing a weakened area into leather or leather-like material forming the visible cover on the side of the visible cover facing away from the visible side. The transition from the weakened area to the non-weakened is designed constant. At least one layer of a material that is softer than the material of the molding is applied on the molding. The visible cover is applied onto the layer of softer material.

18 Claims, 3 Drawing Sheets

U.S. PATENT DOCUMENTS

| | | |
|---|---|---|
| 6,022,623 A | 2/2000 | Clerici |
| 6,042,139 A | 3/2000 | Knox |
| 6,109,645 A | 8/2000 | Totani et al. |
| 6,113,131 A | 9/2000 | Uehara et al. |
| 6,199,897 B1 | 3/2001 | Kreile |
| 6,276,712 B1 | 8/2001 | Welch et al. |
| 6,325,410 B1 | 12/2001 | Eyrainer |
| 6,357,788 B2 * | 3/2002 | Kreile ............... 280/728.3 |
| 6,378,894 B1 * | 4/2002 | Trevino et al. ........... 280/728.3 |
| 6,402,189 B1 | 6/2002 | Gray et al. |
| 6,440,514 B1 * | 8/2002 | Ueno et al. ............... 428/43 |
| 6,657,158 B1 * | 12/2003 | Skelly et al. ........... 219/121.71 |
| 6,753,057 B1 | 6/2004 | Gardner |
| 6,764,633 B2 * | 7/2004 | Takahashi et al. ............ 264/259 |
| 7,014,209 B2 * | 3/2006 | Müller et al. ............ 280/728.3 |
| 7,121,578 B2 * | 10/2006 | Cowelchuk et al. ........ 280/728.3 |
| 7,139,650 B2 | 11/2006 | Lubischer |
| 7,458,604 B2 * | 12/2008 | Hier et al. ............... 280/728.3 |
| 2002/0060447 A1 | 5/2002 | Acker et al. |
| 2002/0164528 A1 | 11/2002 | Sunagawa et al. |
| 2003/0011174 A1 | 1/2003 | Merrifield et al. |
| 2004/0155441 A1 | 8/2004 | Hofmann |
| 2004/0164531 A1 | 8/2004 | Riha et al. |
| 2004/0199319 A1 | 10/2004 | Lubischer |
| 2005/0040629 A1 | 2/2005 | Chausset |
| 2005/0052005 A1 | 3/2005 | Lunt et al. |
| 2005/0215143 A1 | 9/2005 | Hehn |
| 2006/0082106 A1 | 4/2006 | Hier et al. |
| 2006/0082109 A1 * | 4/2006 | Hier et al. ................... 280/732 |

FOREIGN PATENT DOCUMENTS

| | | |
|---|---|---|
| DE | 19648138 A1 | 5/1998 |
| DE | 29648138 A1 | 5/1998 |
| DE | 198 19 537 A1 | 11/1998 |
| DE | 198 00 815 C1 | 2/1999 |
| DE | 19944371 A1 | 3/2001 |
| DE | 101 17 938 A1 | 4/2001 |
| DE | 101 04 036 A1 | 8/2001 |
| DE | 101 35 224 A1 | 7/2002 |
| DE | 102 29 962 A1 | 1/2004 |
| DE | 10241715 A1 | 3/2004 |
| DE | 103 15 662 A1 | 10/2004 |
| DE | 103 61 581 A1 | 7/2005 |
| DE | 102004014942 A1 | 10/2005 |
| EP | 0827867 A1 | 7/1997 |
| EP | 0916555 A | 5/1999 |
| EP | 1 445 156 A1 | 11/2003 |
| FR | 2 721 876 A1 | 1/1996 |
| FR | 2792271 A | 10/2000 |
| FR | 2799700 A | 4/2001 |
| JP | 05162598 A | 6/1993 |
| JP | 0827409 | 1/1996 |
| WO | WO 97/03866 A | 2/1997 |
| WO | WO 2004/087473 A | 10/2004 |

OTHER PUBLICATIONS

European Search Report EP06004407, dated Jun. 1, 2006.
European Search Report EP06004408, dated May 2, 2006.
European Search Report EP06004409, dated May 3, 2006.

* cited by examiner

INVISIBLE AIRBAG COVER HAVING A TEAR LINE

BACKGROUND

1. Field

Aspects of the invention relate to an airbag cover, in particular for use in motor vehicles, having a molding and a visible cover over the molding, with a suitable tear line in the cover.

2. Discussion of Related Art

In some motor vehicles, large areas of the interior trim such as for example the steering wheel, dashboard and door trims, are covered with leather or a leather-like material for decorative reasons. The leather or leather-like material also serves as a visible cover of the parts of the vehicle interior, including the airbag module.

Usually an airbag is disposed below a molding finished with a visible cover, where the molding is designed so that on triggering of the airbag, parts of the molding move along pre-defined fold or tear lines so that suitable deployment of the airbag can occur. The same is true for the visible cover of the molding. The materials used for the visible cover should not impede airbag deployment as well as movement of the molding parts.

Therefore previously either a tear seam was introduced into the visible covers made of leather or leather-like material or, where desirable for aesthetic reasons, a desired tear line was introduced invisibly in the form of a back cut in the cover material. The depth of the back cut varied from a maximum value in the area of the desired tear initiation to a minimum value in the areas which are furthest removed from the tear initiation area of the tear line. The tools for making such a back cut are, however, expensive. In addition the tool guide is extremely complex, in particular with the setting of different cutting depths.

DE 195 16 230 C2 discloses an airbag cover having a tear line formed of a partial reduction of material thickness that is generated by removal of material from the cover. This removal can be made both on the side of the visible cover facing the molding and on the side facing away from the molding. Due to the material removal made in the visible cover, a geometry with a curving transition from non-weakened to weakened area is provided.

In DE 195 16 230 C2, the cover, which is partially reduced in thickness, is applied directly to a dimensionally rigid molding, as found for example, on a steering wheel. The forces acting on the visible cover, in particular in the area of the reduced material thickness, are absorbed by the adhesive layer applied between the molding and visible cover. The lateral distortion of the visible cover is minimized by the internal joint between the visible cover and the molding.

To improve the feel in the dashboard area and hence in the area of airbag covers, the leather or leather-like materials used as visible covers have been padded at least with one layer that has a greater softness than the comparatively rigid molding. Such materials are, for example, spacer fabrics, foams, fleece or similar materials. As stated above, these materials are covered with a leather or leather-like material, which, in the area of the desired tear line, has a back cut with a variable depth along the tear line. Due to the reduced ability of the layers of softer material to absorb the forces acting on the visible cover, for example under alternating climate loads or partial heating from intensive solar radiation, at least one further intermediate layer of a film-like material is used between the cover and molding. Intense material stress caused by these environmental effects, however, has proved visually unsatisfactory in use.

SUMMARY

In one illustrative embodiment, an airbag cover for use in motor vehicles is provided. The air bag cover has a molding and a visible cover covering the molding. The cover is made of leather or leather-like material. The cover has a weakened area, with a transition from the weakened area to a non-weakened area being constant. At least one layer of a material that is softer than the molding is disposed between the molding and the visible cover.

In another illustrative embodiment, a method for covering a molding disposed above an airbag is provided. The method includes producing a visible cover having a weakened area in leather or leather-like material whereby a transition from the weakened area to a non-weakened area is constant. The method also includes applying, to the molding, at least one layer of a material that is softer than the material of the molding and applying the visible cover to the layer of softer material such that the weakened area of the cover faces toward the layer of softer material.

Various embodiments of the present invention provide certain advantages. Not all embodiments of the invention share the same advantages and those that do may not share them under all circumstances.

Further features and advantages of the present invention, as well as the structure of various embodiments of the present invention are described in detail below with reference to the accompanying drawings.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. Various embodiments of the invention will now be described, by way of example, with reference to the accompanying drawings, in which.

DETAILED DESCRIPTION

Figure 1:
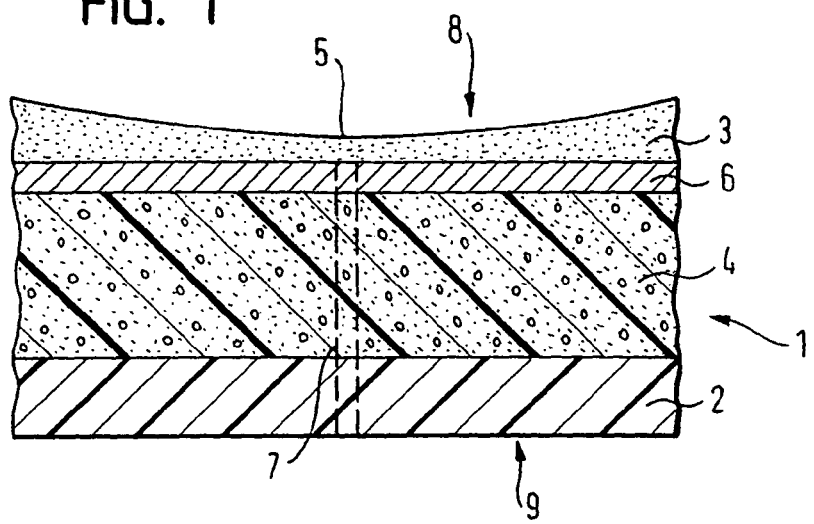
FIG. 1 a cross-section view through an airbag cover according to a first embodiment of the invention.

According to a first aspect, an airbag cover is provided which comprises a molding, at least one layer of material softer than the material of the molding, and a visible cover, which may be formed of leather or leather-like material, having a partial weakening. The transition from the weakened area to the non-weakened area is constant.

As used herein with respect to the transition area, the term "constant" means any form of transition which is structured without corners and/or burrs and/or steps, whereby the visible cover in cross-section has a curve which rises and falls monotonously in the transition area from weakened to non-weakened areas. In this manner, a gradual, smooth transition is provided.

It has been found that visible coatings processed according to this aspect tolerate alternating climate stress even in the freshly applied state without it being necessary to add a film between the visible cover and the molding (and above a cushion layer if used). In addition, in one embodiment, little to no perceptible visible deterioration in appearance occurs. Also, in one embodiment, otherwise costly process control where different cut depths would have to be set over the course of the desired tear line, can be omitted.

In one embodiment, the airbag cover even after alternating climate tests in which the visible coating is exposed to temperature changes between 0° C. and 105° C. and simultaneously to intensive simulated solar radiation, does not show any visual deterioration in the area of the tear line even if the leather or leather-like material is freshly applied to the molding. In addition, the desired tear behavior on triggering of the airbag is maintained over the life of the airbag cover. In one embodiment, the cover material is subjected to extensive material removal by means of suitable devices. Examples of such suitable arrangements and/or processes may be found in DE 39 22 756 C2 and in DE 195 16 230 C2 (both of which are hereby incorporated by reference in their entireties). As mentioned, in one embodiment, the transition between the non-weakened and weakened area and the cross-section form of the weakened area itself are constant. Other suitable material removal procedures may be employed, as the present invention is not limited in this regard.

In one embodiment, the molding is part of the dashboard. In one embodiment the dashboard is formed in the area of the passenger seat. This provides an airbag cover, where the production of seams can be omitted even in the normally large surface area in front of the passenger (behind which lies a relatively large airbag molding would otherwise require seams) as is the case with prior art airbag covers. Other locations for the airbag cover within the passenger compartment are contemplated, as the present invention is not limited in this regard.

In one embodiment, the layer of softer material comprises a suitable spacer fabric. This spacer fabric, because of its large gas volume proportion and with its fibers having a desired direction, provide a desired feel. In this regard, both the impression resistance and the shift resistance on impression of the visible cover provide the desired feel. Other cushion materials may be employed, as the present invention is not limited in this regard.

In one embodiment, the layer of softer material comprises a foam. This creates an airbag cover which, although using economic materials and economic production processes, can be designed to provide desired feel. In this regard, both the selection of suitable starting materials and propellants and the setting of suitable process parameters, allows any suitable cushion characteristics to be provided, even for a pre-specified and constant cushion layer thickness.

In another embodiment, the layer of softer material comprises one or more gel cushions. By suitable positioning of the gel cushions, a desired tear line may be provided. Also, the feel of the airbag cover can be set not only virtually to any degree but also different feel can be achieved over the area to be covered.

In one embodiment, at least one film layer is disposed between the molding and the visible cover. In one embodiment, the film layer is disposed directly below the visible cover. This creates an airbag cover in which the shear forces acting on the visible cover can be accommodated. In one embodiment, the connection between the individual layers can be achieved even with the use of softer layers with open pore surface and the resulting reduced ability to apply an adhesive over a broad surface. It should be appreciated that a film layer need not be employed, as the present invention is not limited in this regard.

In one embodiment, the visible cover in its weakened area has a residual wall thickness between approximately 0.1 mm and approximately 0.6 mm. In one embodiment, the residual wall thickness is between approximately 0.2 mm and approximately 0.5 mm. In one embodiment, the thickness of the visible cover in the weakening area is approximately 0.35 mm. With these embodiments, an airbag cover whereby a material removal is adequate for tear initiation and propagation is provided. Moreover, the material removal is reduced to a minimum. An airbag cover is produced in which the visible cover provides unhindered deployment of the airbag. Other suitable residual wall thickness may be employed, as the present invention is not limited in this regard.

In one embodiment, the molding and layer of softer material and the film layer, if applied, also have a weakened area. In one embodiment, these weakened areas are disposed above each other. In one embodiment, these weakened areas are made in the molding, the layer of softer material and the film, by the application of at least one cut into the materials. The cut can be formed by any suitable manner, as the present invention is not limited in this regard. In one embodiment, the use of a laser for laser perforation of the materials is employed. This creates an airbag cover which, preferably with no effect on appearance of the visible cover, provides an almost unhindered tear progression along precisely defined lines.

In one embodiment, the weakened area in the visible cover runs at least partly above a weakened area in the molding. However, it should be appreciated that the invention is not limited in this regard, as the one or more weakened areas in the various materials need not be disposed directly above one another. In this regard, the weakened area of the visible cover need not completely follow the weakened area of the materials underneath. In one embodiment, the weakened area in the visible cover follows the tear lines within the molding over only part lengths. In addition, the weakened area in the visible cover need not have the same length as the weakened area in one of the layers disposed below. Further, in one embodiment, the weakened area within the visible cover may be provided only in the area of a desired tear initiation.

In one embodiment, the weakened area in the visible cover is made in the side of the visible cover facing the molding, i.e., in the side facing away from the vehicle passengers. This provides an airbag cover which achieves a material removal in the visible cover exclusively in the areas which are not visible on assembly of the airbag cover. The appearance of the visible cover, for example, the grain pattern in leather or leather-like materials, is not adversely affected.

In one embodiment, the molding and/or the layer of softer material at the location of the weakened area of the visible cover, has a thickness greater than the other areas. In one embodiment, the location with greater thickness is designed so that it corresponds in shape and/or depth (thickness) to the thickness of the weakened area in the visible cover. For instance, as the thickness of the cover material increases at locations away from the weakened area, a corresponding decrease in thickness in the one or more other layers occurs. This creates an airbag cover that has a constant thickness throughout and creates an almost even material shape over the entire area of the airbag cover despite the material removal in the visible cover. Thus, in one embodiment, the weakened area in the visible cover over its entire length has a relatively constant form and/or depth. However, it should be appreciated that the present invention is not limited in this regard, as other suitable thickness arrangements may be employed.

In an alternative embodiment, the weakened area in the visible cover has an irregular form over the length of the weakened area. The irregular form may relate to the depth of the weakened area or to the form of the transitional regions from non-weakened to weakened areas or to the width of the weakened area, or to any other dimensional change, or any combination thereof. As a result, in one embodiment, with suitable design of the irregular form, a weakened area can be created which follows the grain of the leather or leather-like material and material irregularities and either bypasses or traces these lines, for example.

As mentioned above, the transition from the weakened area in the visible cover is constant. In one embodiment, the transition in the surface of the weakened area describes a curve starting from the non-weakened area over the weakened area back to the non-weakened area. In this regard, a constantly increasing negative gradient from a non-weakened area through to a reversal point and then a constantly decreasing negative gradient through to an apex of the curve, then a constantly rising positive gradient through to a reversal point and then finally a constantly reducing positive gradient to a non-weakened area is provided. The first derivative of such a curve then shows a sinusoidal course. This provides an airbag cover where the weakened area made in the visible cover is provided with transitions which are generally not evident to the naked eye and generally not perceptible to the touch. However, the present invention is not limited in this regard, as other suitable transitions may be employed.

Furthermore in one embodiment, a constant design of the transitional region from non-weakened area to weakened area is provided. In this regard, a wide weakened area in the visible cover is provided and a curving course is present only in the transitions. In the area of maximum material removal, the weakened area is straight and lies in a plane that is parallel to the plane spanned by the visible side of the visible cover.

According to another aspect of the invention, a method is disclosed for covering a molding disposed above an airbag with a partially weakened visible cover. In one embodiment, this method includes providing a weakened area in the material forming the visible cover on the side of the visible cover facing away from the visible side (i.e., the passenger side), where the transition from weakened area to non-weakened area is constant. In one embodiment, the method includes applying onto the actual molding itself at least one layer of a material that is made softer than the material of the molding, and applying a visible cover to the layer of softer material. In one embodiment, the visible cover material is made of leather or leather-like material, although other suitable materials may be employed, as the present invention is not limited in this regard.

In another embodiment, the method includes introducing at least one film layer between the molding and the visible cover. In one embodiment, this film layer may be inserted directly below the visible cover and directly above the molding or between several layers of softer material. In this manner, an airbag cover having a wide variety of soft materials may be provided.

In one embodiment, before joining together the individual layers of the airbag cover, the thicknesses of the individual (or several layers) and hence the molding and/or the layer of softer material, has a greater thickness than the remaining areas, especially in the weakened area of the visible cover. In one embodiment, the thicker area in the one or more of layers disposed below the visible cover corresponds in form and/or depth to the weakened area in the visible cover. This provides an airbag cover having a constant thickness over the entire surface of the airbag cover. In one embodiment, the individual layers of the airbag cover may be joined by back-molding the individual layers with a hardening plastic.

Turning now to the figures, exemplary embodiments of the invention will now be described.

FIG. 1 shows a schematic cross-section view of an airbag cover 1 according to a first embodiment, where the airbag cover 1 generally comprises four layers disposed above each other. A molding 2 of a form-rigid plastic is disposed above the side 9 facing away from the visible side 8 and the airbag module (not shown). Above this molding 2 is disposed a closed pore foam layer 4. Above this soft foam layer 4 and below a visible cover 3 made of leather and terminating towards the visible side 8, an additional film layer 6 is provided into the airbag cover 1. The visible cover 3 has a weakened area 5, which, in the view shown extends over the entire width of the Figure. The foam layer 4 and film layer 6 also includes a back cut 7, which in one embodiment, is disposed below the apex of the curve simulating the weakened area 5. Such alignment of the weakened area 7 to the weakened area 5 is not however essential as the present invention is not limited in this regard. In one embodiment, the airbag cover 1 is produced so that first the molding 2, the foam layer 4 and the film layer 6 are joined together and in this composite structure, a common weakened area 7 in the form of short weakened areas aligned with each other is made. In another embodiment, a weakened area following a zigzag line may be provided. In a separate work process, the visible cover 3 material is removed on the side 9 facing the composite of molding 2, foam layer 4 and film 6. Then the composite 2, 4, 6 is glued together over a large area with the worked visible cover 3 so that, because of the material removal previously made on the back, an airbag cover 1 is produced where the weakened area 5 has a recess towards the visible side 8.

Figure 2:
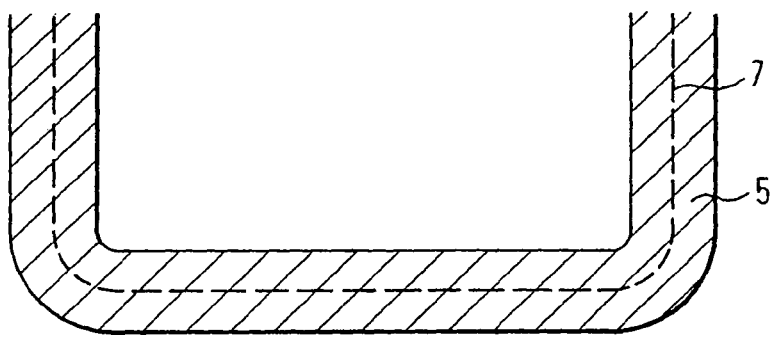
FIG. 2 a schematic representation of a top view of the weakened area of the visible cover according to a first embodiment of the invention.

FIG. 2 shows the weakened area 5 of the visible cover (not shown) above the weakened area of the molding, which is shown by dashed lines, and all layers disposed above. The weakened area 5 of the visible cover is represented by hatch marks. Despite its constant and gentle transition from non-weakened area of the visible cover to weakened area 5, the weakened area has sides disposed clearly parallel to each other. The weakened area 5 in this embodiment is disposed over the entire length of the weakened area 7 of the molding. In addition the weakened area 7 runs directly below the weakened area 5 at its maximum depth.

Figure 3:
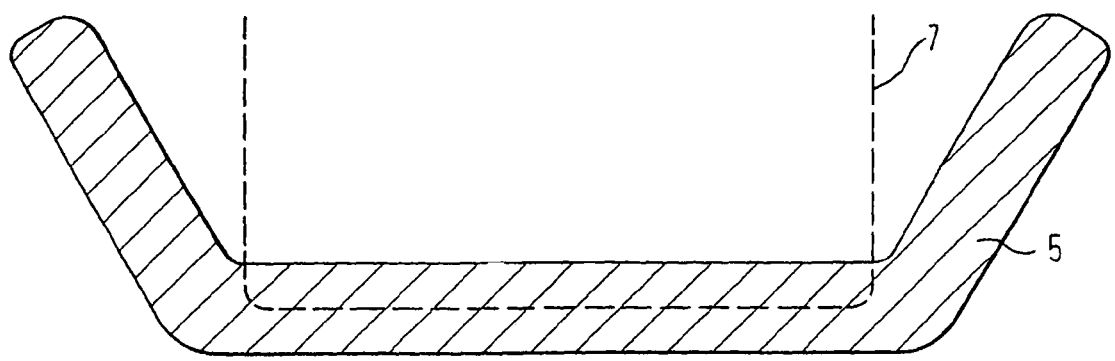
FIG. 3 a schematic representation of a top view of the weakened area of the visible cover according to a second embodiment of the invention.

FIG. 3 shows a further embodiment of the weakened area 5 of the visible cover (not shown) which substantially follows the weakened area 7 within a molding (not shown) only along a single straight line. Whereas the weakened area 7 of the molding is designed substantially rectangular and hence traces a rectangular panel above an airbag module (not shown), the line traced by the weakening area 5 of the visible cover (not shown) has a symmetrical course with angles clearly greater than 90°.

Figure 4:
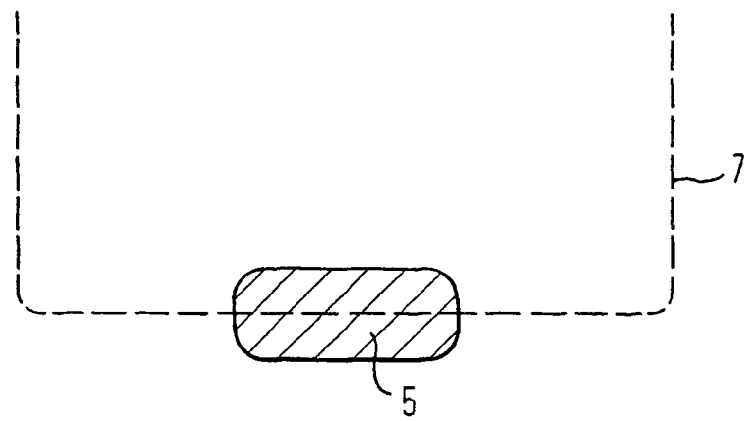
FIG. 4 a schematic representation of a top view of the weakened area of the visible cover according to a third embodiment of the invention.

FIG. 4 shows a further embodiment of the weakened area 5 of the visible cover which is designed within the layers disposed below the visible coating and above the weakened area 7 only in a part region of the airbag cover (not shown). The weakened area 5 here forms only the area of the tear initiation in the visible cover. On triggering of the airbag, in this embodiment, further tear progression is defined solely by the weakened area 7.

Figure 5:
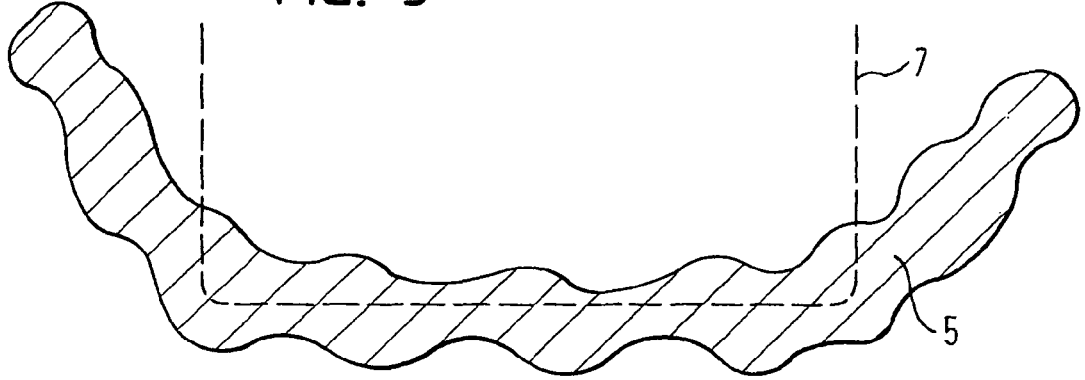
FIG. 5 a schematic representation of a top view of the weakened area of the visible cover according to a fourth embodiment of the invention.

FIG. 5 shows a further embodiment of a weakened area, the alignment of which corresponds substantially to the embodiment shown in FIG. 3. In addition, however, the side regions of the weakened area 5 area not parallel to each other at least in certain regions. The side lines of the weakened area 5 in this embodiment, follow the grain or other material composition of the visible cover.

Figure 6:
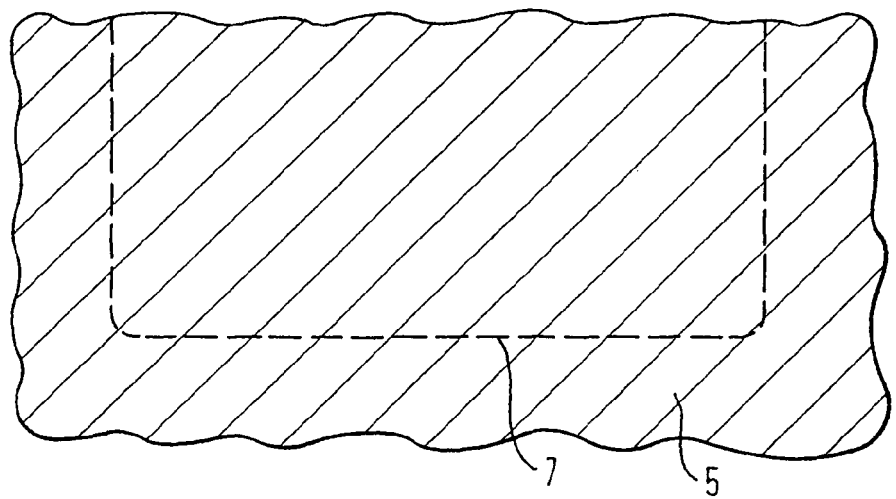
FIG. 6 a schematic representation of a top view of the weakened area of the visible cover according to a fifth embodiment of the invention.

FIG. 6 shows a further embodiment of an airbag cover in which the weakened area 5 of the visible cover is designed over a large area above an airbag flap traced in the molding by the weakened line 7. Thus, in this embodiment, the edge regions of the weakened area 5 can be designed both linear and, as shown in the Figure, or running along irregular or curved lines.

Figure 7:
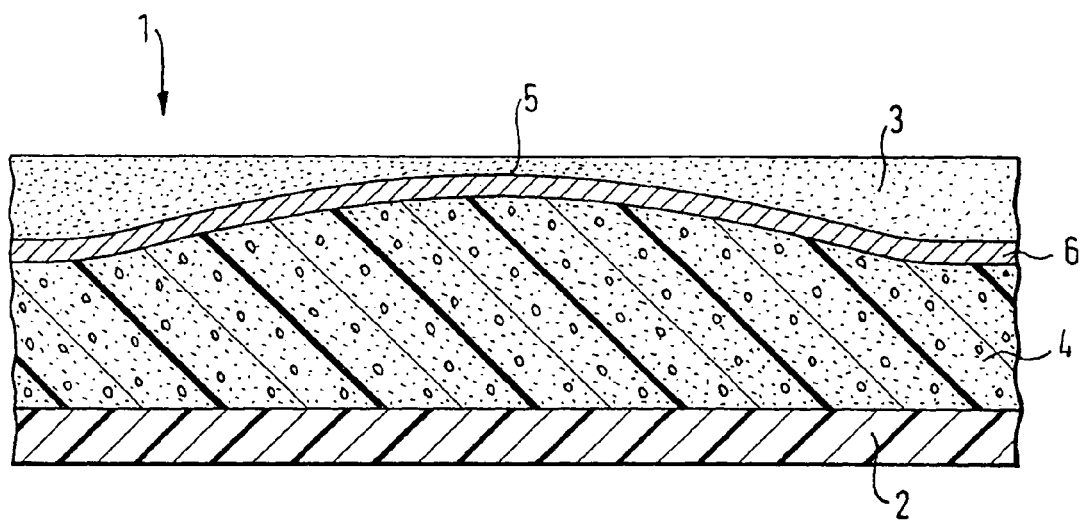
FIG. 7 a cross-section view through an airbag cover according to another embodiment of the invention.

FIG. 7 shows a cross-sectional view of another embodiment of an airbag cover 1 having a molding 2, a foam layer 4, a film layer 6 and a visible cover 3 of leather disposed above the film layer. The visible cover 3 has a weakened area 5 in which the transition from non-weakened area (right and left in the Figure) to weakened area 5 (centrally in the Figure) is constant and follows a curve. The first derivative of the curve represents a sinusoidal course. In the embodiment shown, the thickness of the foam 4 varies inversely with the thickness of the visible cover 3 so that the total thickness of the airbag cover 1 is constant over the area shown.

Figure 8:
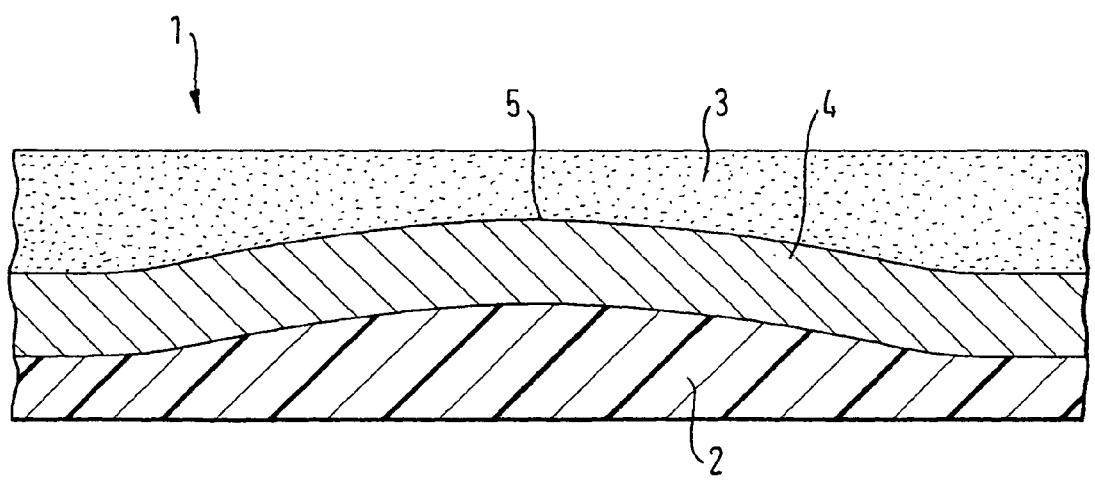
FIG. 8 a cross-section view through an airbag cover according to yet another embodiment of the invention.

FIG. 8 shows a further embodiment of an airbag cover 1. In this embodiment, the airbag cover has a constant thickness over its entire width. In this embodiment the constant thickness of the airbag cover 1 is achieved in that the form of the molding 2 corresponds to the form of the visible cover 3 so that the weakened area 5 in the visible cover 3 is compensated completely by the of greater thickness of the molding 2. Thus, in this embodiment, a spacer fabric 4 of constant thickness can be used between the molding 2 and the visible cover 3.

It should be appreciated that various embodiments of the present invention may be formed with one or more of the above-described features. The above aspects and features of the invention may be employed in any suitable combination as the present invention is not limited in this respect. It should also be appreciated that the drawings illustrate various components and features which may be incorporated into various embodiments of the present invention. For simplification, some of the drawings may illustrate more than one optional feature or component. However, the present invention is not limited to the specific embodiments disclosed in the drawings. It should be recognized that the present invention encompasses embodiments which may include only a portion of the components illustrated in any one drawing figure, and/or may also encompass embodiments combining components illustrated in multiple different drawing figures.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. An airbag cover for use in motor vehicles, the airbag cover comprising:
    a molding;
    a visible cover covering the molding, the visible cover being made of leather, the visible cover having a weakened area, the visible cover in cross-section having a curve which rises and falls monotonously in an area of transitions from the weakened area to non-weakened areas to provide gradual and smooth transitions that are constant; and
    at least one layer of a material that is softer than the molding disposed between the molding and the visible cover.

2. The airbag cover according to claim 1, in combination with a passenger seat dashboard, wherein the molding forms part of the dashboard.

3. The airbag cover according to claim 1, wherein the layer of softer material comprises a spacer fabric.

4. The airbag cover according to claim 1, wherein the layer of softer material comprises a foam.

5. The airbag cover according to claim 1, wherein the layer of softer material comprises one or more gel cushions.

6. The airbag cover according to claim 1, further comprising at least one film layer disposed between the molding and the visible cover.

7. The airbag cover according to claim 6, wherein the at least one film layer is disposed between the softer material and the visible cover.

8. The airbag cover according to claim 1, wherein the weakened area has a maximum residual wall thickness between approximately 0.1 mm and approximately 0.6 mm.

9. The airbag cover according to claim 8, wherein the weakened area has a maximum residual wall thickness between approximately 0.2 mm and approximately 0.5 mm.

10. The airbag cover according to claim 1, wherein the molding and the layer of softer material each have a weakened area that are aligned with each other.

11. The airbag cover according to claim 10, wherein the weakened area in the molding and the layer of softer material each comprises at least one cut.

12. The airbag cover according to claim 11, wherein the at least one cut comprises a succession of partial cuts aligned with each other.

13. The airbag cover according to claim 1, wherein the weakened area of the visible cover runs at least partly above a weakened area within the molding.

14. The airbag cover according to claim 1, wherein the weakened area of the visible cover is formed in a side of the visible cover facing the molding.

15. A method for covering a molding disposed above an airbag, the method comprising:
    producing a visible cover having a weakened area in leather so that the visible cover in cross-section has a curve which rises and falls monotonously in an area of transitions from the weakened area to non-weakened areas to provide gradual and smooth transitions that are constant;
    applying, to the molding, at least one layer of a material that is softer than the material of the molding; and
    applying the visible cover to the layer of softer material such that the weakened area of the visible cover faces toward the layer of softer material.

16. The method according to claim 15, further comprising inserting at least one film layer between the molding and the visible cover.

17. The method according to claim 16, further comprising forming a weakened area in at least one of the molding, the least one layer of softer material, and the at least one film layer.

18. The method according to claim 15, wherein the softer material comprises one of a spacer fabric, a foam, or at least one gel cushion.

* * * * *